(12) United States Patent
Million et al.

(10) Patent No.: US 8,256,120 B2
(45) Date of Patent: Sep. 4, 2012

(54) VEGETATION TRIMMER HAVING A BLOWING FUNCTION

(75) Inventors: Philip S. Million, Durham (GB); Kevin Stones, Durham (GB)

(73) Assignee: Black & Decker Inc., Newark, DE (US)

( * ) Notice: Subject to any disclaimer, the term of this patent is extended or adjusted under 35 U.S.C. 154(b) by 557 days.

(21) Appl. No.: 12/231,572

(22) Filed: Sep. 4, 2008

(65) Prior Publication Data

US 2009/0090094 A1 Apr. 9, 2009

(30) Foreign Application Priority Data

Oct. 5, 2007 (EP) .................................... 07117950

(51) Int. Cl.
*B25F 3/00* (2006.01)
(52) U.S. Cl. ..................... 30/123.3; 30/278; 56/12.8
(58) Field of Classification Search ............... 30/276, 30/300, 286, 123, 123.3; 15/405, 328
See application file for complete search history.

(56) References Cited

U.S. PATENT DOCUMENTS

| 3,258,907 | A | * | 7/1966 | Hamblin | 368/35 |
| 3,804,190 | A | * | 4/1974 | Shaffer | 180/253 |
| 3,819,308 | A | * | 6/1974 | Ishihara et al. | 418/181 |
| 3,861,374 | A | * | 1/1975 | Dooley et al. | 123/185.14 |
| 4,037,323 | A | | 7/1977 | Seibold | |
| 4,124,938 | A | * | 11/1978 | Ballas, Sr. | 30/276 |
| 4,187,577 | A | * | 2/1980 | Hansen et al. | 15/328 |
| 4,200,978 | A | | 5/1980 | Irelan et al. | |
| 4,227,280 | A | * | 10/1980 | Comer | 15/330 |
| 4,242,794 | A | * | 1/1981 | Peterson | 30/122 |
| 4,259,809 | A | * | 4/1981 | Mabuchi et al. | 446/58 |
| 4,404,706 | A | * | 9/1983 | Loyd | 15/344 |
| 4,578,863 | A | * | 4/1986 | Laverick | 30/276 |
| 4,835,950 | A | * | 6/1989 | Cerreta | 56/12.8 |
| 4,995,861 | A | * | 2/1991 | Erlbruch | 475/298 |
| 5,040,428 | A | * | 8/1991 | Miyaoka et al. | 74/421 A |
| 5,040,950 | A | * | 8/1991 | Dalquist et al. | 417/234 |
| 5,108,154 | A | * | 4/1992 | Brandl et al. | 299/76 |
| 5,311,786 | A | * | 5/1994 | Moribayashi | 74/7 C |
| 5,557,976 | A | * | 9/1996 | Moribayashi et al. | 74/7 E |
| 5,768,749 | A | * | 6/1998 | Ohi et al. | 15/405 |
| 6,301,788 | B1 | * | 10/2001 | Webster | 30/276 |
| 6,415,585 | B2 | * | 7/2002 | Morabit et al. | 56/12.7 |
| 6,553,642 | B2 | * | 4/2003 | Driessen | 29/453 |
| 6,862,875 | B2 | | 3/2005 | Iida et al. | |
| 7,047,592 | B2 | * | 5/2006 | Sing et al. | 15/328 |
| 2001/0027610 | A1 | * | 10/2001 | Wheeler et al. | 30/276 |

(Continued)

FOREIGN PATENT DOCUMENTS

EP 1056327 2/2000

*Primary Examiner* — Sean Michalski
(74) *Attorney, Agent, or Firm* — John Yun (57) ABSTRACT

A vegetation trimmer (10) having a motor (20) with a motor output shaft (30), a cutting head (22) for cutting vegetation, and a gear mechanism (26, 34, 36, 38) for transmitting power from said motor output shaft (30) to the cutting head (22). The motor output shaft (30) has a gear mechanism with a pinion wheel and a fan (28) mounted thereon. The gear mechanism (26, 34, 36, 38) further comprises an internal gear wheel (26) engaging with the pinion wheel (34) and connected to the cutting head (22), whereby the cutting head (22) rotates in the same direction (B) as the fan does (D) during operation of the motor (20).

13 Claims, 7 Drawing Sheets

U.S. PATENT DOCUMENTS

| | | | |
|---|---|---|---|
| 2002/0007559 A1* | 1/2002 | Morabit et al. | 30/276 |
| 2003/0140503 A1* | 7/2003 | Jerez | 30/276 |
| 2004/0020060 A1* | 2/2004 | Peterson | 30/276 |
| 2004/0154127 A1* | 8/2004 | Sing et al. | 15/405 |
| 2006/0005347 A1* | 1/2006 | Griffin et al. | 15/339 |
| 2006/0123635 A1* | 6/2006 | Hurley et al. | 30/276 |
| 2008/0230240 A1* | 9/2008 | Hurley | 172/14 |
| 2008/0271325 A1* | 11/2008 | Hurley | 30/276 |
| 2009/0038283 A1* | 2/2009 | Hurley | 56/12.7 |
| 2009/0090094 A1* | 4/2009 | Million et al. | 56/13.4 |
| 2010/0126023 A1* | 5/2010 | Griffin et al. | 30/123 |
| 2010/0307011 A1* | 12/2010 | Hurley et al. | 30/320 |

* cited by examiner

VEGETATION TRIMMER HAVING A BLOWING FUNCTION

FIELD OF THE INVENTION

The present invention concerns a vegetation trimmer also having a blowing function. Vegetation trimmers are well known power tools comprising a cutting head suitable for use in cutting vegetation, such as grass. The cutting head typically comprises one or more rotating blades, in which case the trimmer is generally known as a brush cutter, or one or more rotating lines, in which case it is generally known as a string trimmer, or a combination of both one or more blades and cutting lines.

Vegetation trimmers which also have a blowing function are known as well. In such a case, air is directed by a fan either to expel vegetation which has already been cut by the trimmer from around the cutting head or to collect the cut vegetation into a receptacle. An example of such a vegetation trimmer which has a combination of blades and cutting line and which also has a blowing function is described in U.S. Pat. Nos. 6,442,845 and 6,460,253 also in the name of the present applicant. In this prior publication, a duct located on a guard surrounding the cutting head blows air from a fan to expel vegetation which has already been cut by the trimmer away from the cutting head.

All vegetation trimmers, whether with or without a blowing function, further comprise a motor, which drives the cutting line and/or blades, causing them to rotate at high speed during operation of the trimmer by a user. Thus, when the cutting head is brought into contact with standing vegetation, the rapidly rotating cutting line and/or blades serve to sever the vegetation as required. In the event that the vegetation trimmer also has a blowing function, the motor drives the fan which directs air as desired, as well as driving the cutting line and/or blades. The motor may be electrically or petrol powered, and if electrically powered, may be supplied either by mains electricity or by a battery pack.

Typically, electric motors rotate at very high speeds of 10,000 or more revolutions per minute. However, lower rotation rates for the cutting line and/or blades are found to be more effective at cutting vegetation than such high rates of rotation. In the event that the motor has such a high rotation rate, it is therefore desirable to include a step-down gear mechanism between the motor and the cutting head, in order to reduce the rotation rate of the cutting line and/or blades. An example of a mains-powered or corded vegetation trimmer comprising such a step-down gear mechanism is described in U.S. Pat. No. 4,578,863 and an example of a battery-powered or cordless vegetation trimmer comprising such a step-down gear mechanism is described in U.S. Pat. Nos. 6,014,812 and 6,301,788, both of which are also in the name of the present applicant.

BACKGROUND OF THE INVENTION

However, in the known art, if the vegetation trimmer comprises a step-down gear mechanism, incorporating such a gear mechanism into a drive train between the motor and the cutting head also has the effect of reversing the direction of rotation of the cutting head compared to the direction of rotation of the motor. For example, if the motor has a motor output shaft which rotates in a clockwise sense, a pinion wheel mounted on the motor output shaft will therefore also rotate in a clockwise sense, which will cause a larger gearwheel with which it comes into contact to rotate in an anti-clockwise sense. Since the larger gearwheel will be mounted on an axle which in turn imparts its own rotation to the cutting head, the cutting head will therefore also rotate in an anti-clockwise sense, opposite to the direction of the motor. On the other hand, if it is desired to provide a vegetation trimmer with a blowing function as well, the fan for directing the air as desired should preferably be mounted directly onto the motor output shaft, without any intervening step-down gear mechanism, in order to maintain the rotation rate of the fan as high as possible, at a higher speed than the cutting head, and therefore make the fan more effective at blowing air and in turn, more effective at moving vegetation cut by the trimmer. Since the fan would then be mounted directly onto the motor output shaft, the fan would therefore rotate in the same direction as the motor, but in an opposite direction to the cutting head. This creates the technical problem that any air blown by the fan would also move in an opposite direction to the cutting head, thus also tending to act in an opposite direction to momentum which has been imparted to vegetation cut by the cutting head and therefore failing to expel the cut vegetation away from the cutting head as desired. As a result, until now, it has been impossible to provide a string trimmer having both a step-down gear mechanism for more effective cutting of vegetation on the one hand and a blowing function for expelling cut vegetation from around the cutting head on the other. An object of the present invention, therefore, is to provide a solution to this technical problem, namely to create a vegetation trimmer having both a step-down gear mechanism for more effective cutting of vegetation and a blowing function for expelling cut vegetation from around the cutting head thereof. Vegetation trimmers with a step-down gear mechanism and a fan driven directly by a motor are of course already known, but in such cases, the fan is only used to provide cooling air to the motor (in which case the direction of the air blown by the fan is irrelevant to the cooling function), and not to provide a blowing function for expelling cut vegetation from around the cutting head of the trimmer as well.

BRIEF SUMMARY OF THE INVENTION

Accordingly, the present invention provides a vegetation trimmer comprising: a motor having a motor output shaft; a cutting head for cutting vegetation presented thereto; a gear mechanism for transmitting power from said motor output shaft to said cutting head, the gear mechanism having a step-down gear ratio for reducing the rate of rotation of the cutting head relative to the rate of rotation of the motor, the gear mechanism comprising a pinion wheel mounted on the motor output shaft; and a fan also mounted on the motor output shaft; wherein the gear mechanism further comprises an internal gear wheel engaging with the pinion wheel and connected to the cutting head, whereby the cutting head rotates in the same direction as the fan during operation of the motor.

Thus, since the pinion wheel mounted on the motor output shaft engages with an internal gear wheel, the direction of rotation of the pinion wheel is maintained by the internal gear wheel as it rotates, even if the speed of rotation of the internal gear wheel is reduced relative to the speed of rotation of the pinion wheel and the motor output shaft. Accordingly, since the cutting head is connected to the internal gear wheel, it also rotates in the same direction as the fan mounted on the motor output shaft, although at a lower speed, and the fan blows air which can be used to direct cut vegetation away from the cutting head as desired.

Preferably, the fan is enclosed within a substantially equiangular spiral volute centred on the motor output shaft, wherein the volute has a first bearing for the pinion wheel centrally located on an end face of the volute and a second bearing for the internal gear wheel located on the same end face at an offset from the first bearing. A volute with the shape of an equiangular spiral is found to be the most efficient in capturing and directing air blown by the fan. If the end face of the volute is provided with bearings for the pinion wheel and the internal gear wheel in the manner described, the volute may then double-up in function, both as a volute and as a mounting plate for the gears. This minimizes the number of components of the vegetation trimmer, thereby reducing manufacturing costs.

In a preferred embodiment, the volute has an exit mouth connected to a duct having a substantially uniform cross-section mounted on a guard for the cutting head, and the duct has an air outlet located on a radial edge of the guard at a distance from a center of the guard which coincides with the swathe of a cutting element (such as a length of cutting line) mounted on the cutting head, when the cutting element is caused to rotate by operation of the motor. Guards are quite common components of vegetation trimmers, which are provided in order to protect users from the cutting elements when they are rotating, as well as from flying debris, to which momentum has been imparted by the cutting element. However, in such a case, air exiting the mouth of the volute will also be shielded from the cutting element by the guard, so it is necessary for the air from the volute to be redirected to a location on the guard where it will still be able to blow vegetation cut by the trimmer. A duct with a substantially uniform cross-section and mounted in the location as described above is found to be the most effective way of achieving this. By locating the air outlet of the duct at a similar distance from the centre of the guard as the swathe of the cutting element when it is rotating, air exiting the duct picks up vegetation which has been cut by the cutting element at its maximum tangential velocity, thereby blowing the vegetation furthest from the cutting head.

The guard itself may be assembled from two or more component pieces in order to save space during shipping and warehousing of the vegetation trimmer. In such a case, it is preferable that the duct should be fully mounted on just one of the pieces of the guard for ease of assembly of the guard by an end-user.

Since it would be extremely difficult to mold the duct and the guard as a single component, the duct must instead be mounted to the guard either during manufacture or during subsequent assembly by an end-user. However, this has the disadvantage that it creates a joint between the duct and the guard, through which air blown by the fan may escape by leakage, thereby reducing the amount of air exiting the air outlet of the duct and thus the overall efficiency of the air-blowing function of the trimmer. Accordingly, it is desirable that the duct should comprise a liner moulded as a single component which is able to direct the air from the volute to the air outlet of the duct without leakage, thereby maintaining the efficiency of the air-blowing function.

The efficiency of the air-blowing function may be maximized by locating the air outlet of the duct on the edge of the guard at a level which is parallel to a cutting element of the cutting head and with the air outlet oriented parallel to a radius of the cutting head, so that air exiting the duct blows tangentially to rotation of the cutting element during operation of the motor. In this way, vegetation cut by the cutting element, which is also ejected tangentially from the cutting head, is picked up by the tangential airflow in the most effective fashion and is blown away from the cutting head as desired.

Preferably, the exit mouth of the volute comprises a spout projecting from the end face of the volute in the direction of the cutting head. This has two advantages. Firstly, the presence of the spout makes it easier to engage the duct with the volute without leakage. Secondly, the fact that the spout projects from the end face of the volute in the direction of the cutting head also helps to bring the exit point of the air from the volute closer to the cutting head, allowing the duct to be made shallower and less sharply angled, which reduces losses in the efficiency of the airflow through the duct caused by friction.

BRIEF DESCRIPTION OF THE DRAWINGS

Further features and advantages of the present invention will become apparent from the following detailed description of the invention, which is given by way of example and in association with the accompanying drawings, in which.

DETAILED DESCRIPTION OF THE INVENTION

Figure 1:
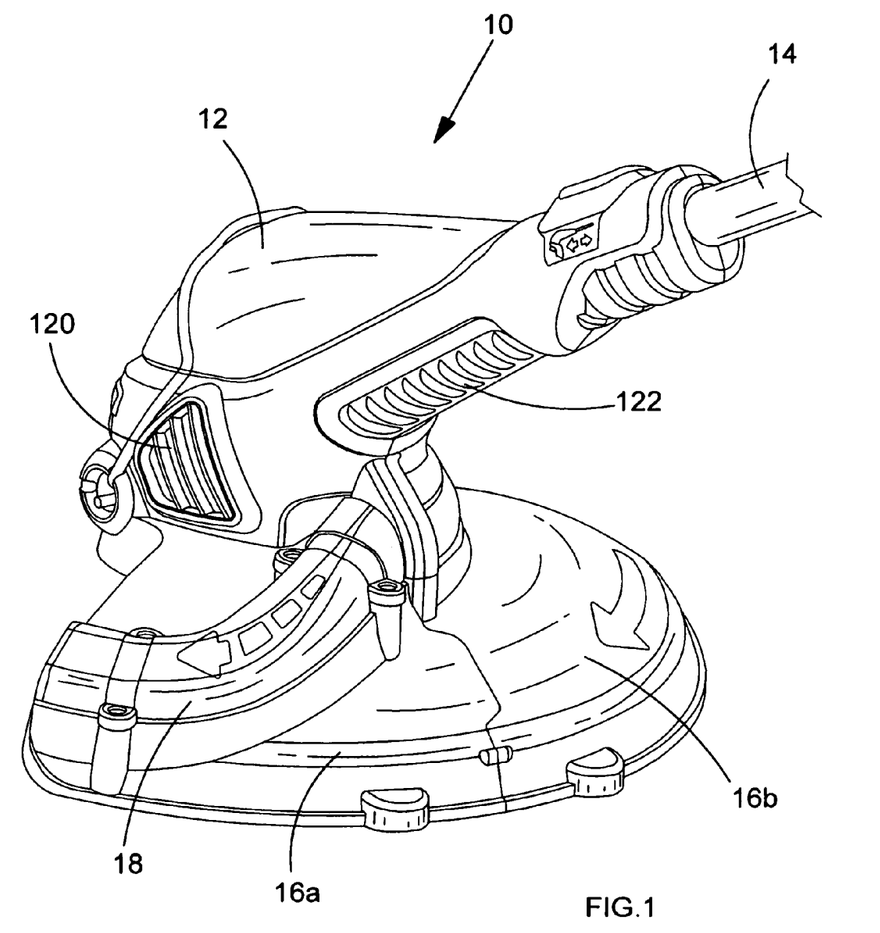
FIG. 1 is a perspective view of a lower end part of a vegetation trimmer according to an embodiment of the invention.

Referring firstly to FIG. 1, there is shown a lower end part of a vegetation trimmer 10, comprising a motor housing 12, a shaft 14 and a guard. The guard is formed from two component pieces 16*a*, 16*b*. Mounted on one of the component pieces 16*a* of the guard is a duct 18 for conveying air. The motor housing 12 additionally comprises air inlet vents 120 and outlet vents 122 for providing cooling air to a motor contained therein.

Figure 2:
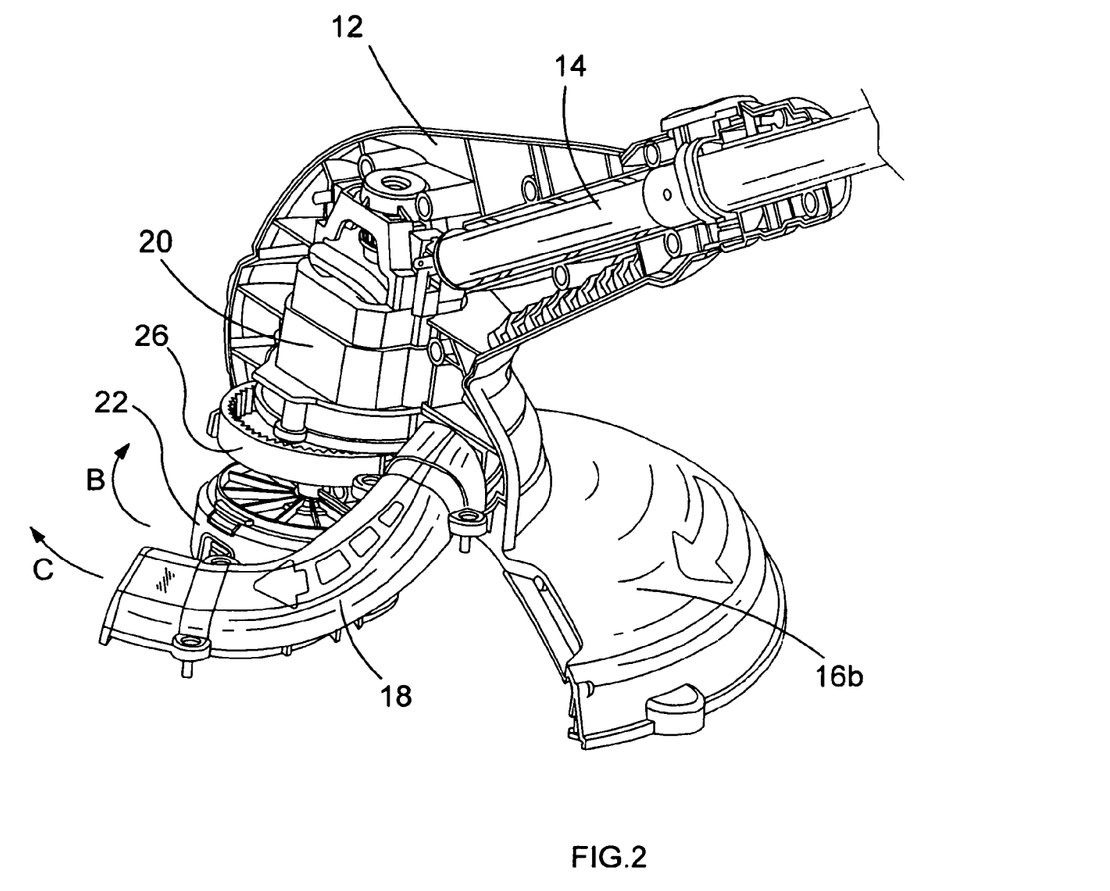
FIG. 2 is a partial cut-away view of the lower end part of the vegetation trimmer shown in FIG. 1.

FIG. 2 is a partial cut-away view of the lower end part of the vegetation trimmer shown in FIG. 1. Within motor housing 12 there may be seen the motor 20. Electrical power for the motor is supplied thereto by electrical wires contained within shaft 14. When the motor is running, cutting head 22 is caused to rotate thereby in the direction indicated by arrow B. At the same time, air is expelled from duct 18 in the direction indicated by arrow C as a result of being blown by a fan contained within volute 24. As can be seen in FIG. 2, the drive train from the motor to the cutting head 22 includes an internal gear wheel 26.

Figure 3:
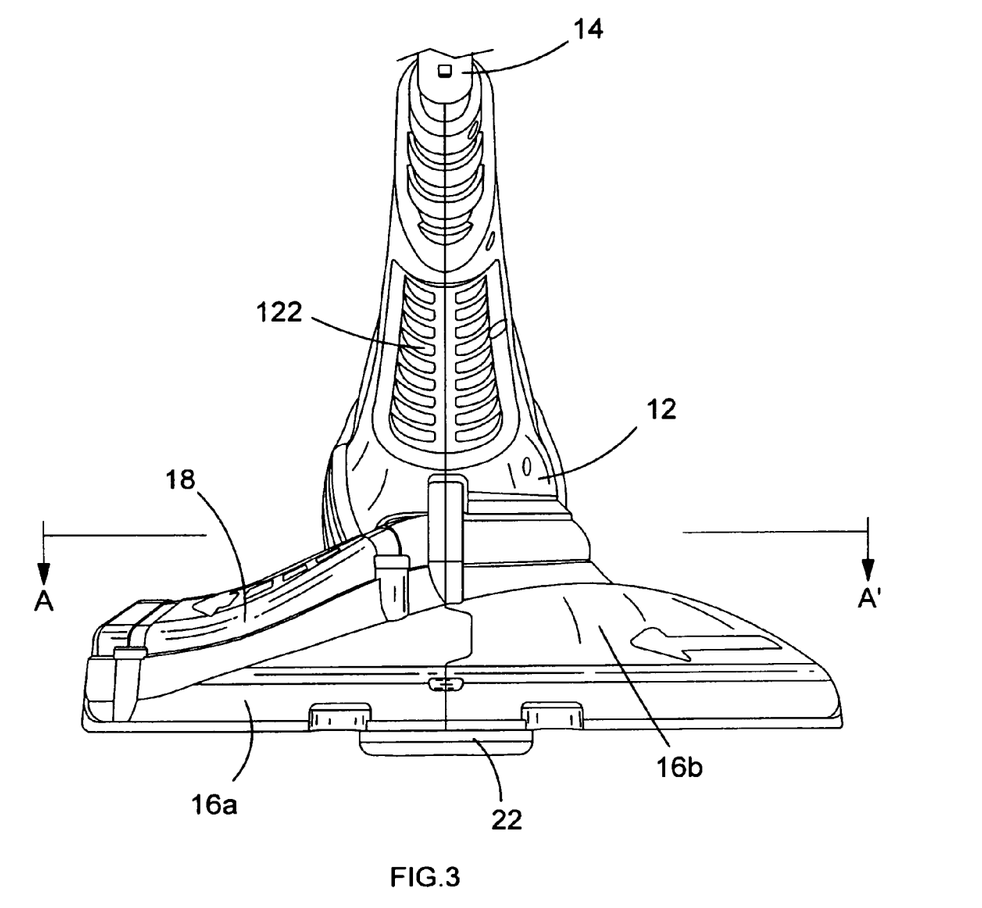
FIG. 3 is a rear elevational view of the lower end part of the vegetation trimmer of FIG. 1.

Turning now to FIG. 3, there is shown an elevational view of the lower end part of the same vegetation trimmer, seen from the rear thereof. As may be seen in FIG. 3, the cutting head 22 protrudes slightly from beneath the guard 16*a*, 16*b* and the duct 18 mounted on guard piece 16*a* conveys air from a level parallel with the volute 24 to the level of the cuffing head 22.

Figure 4:
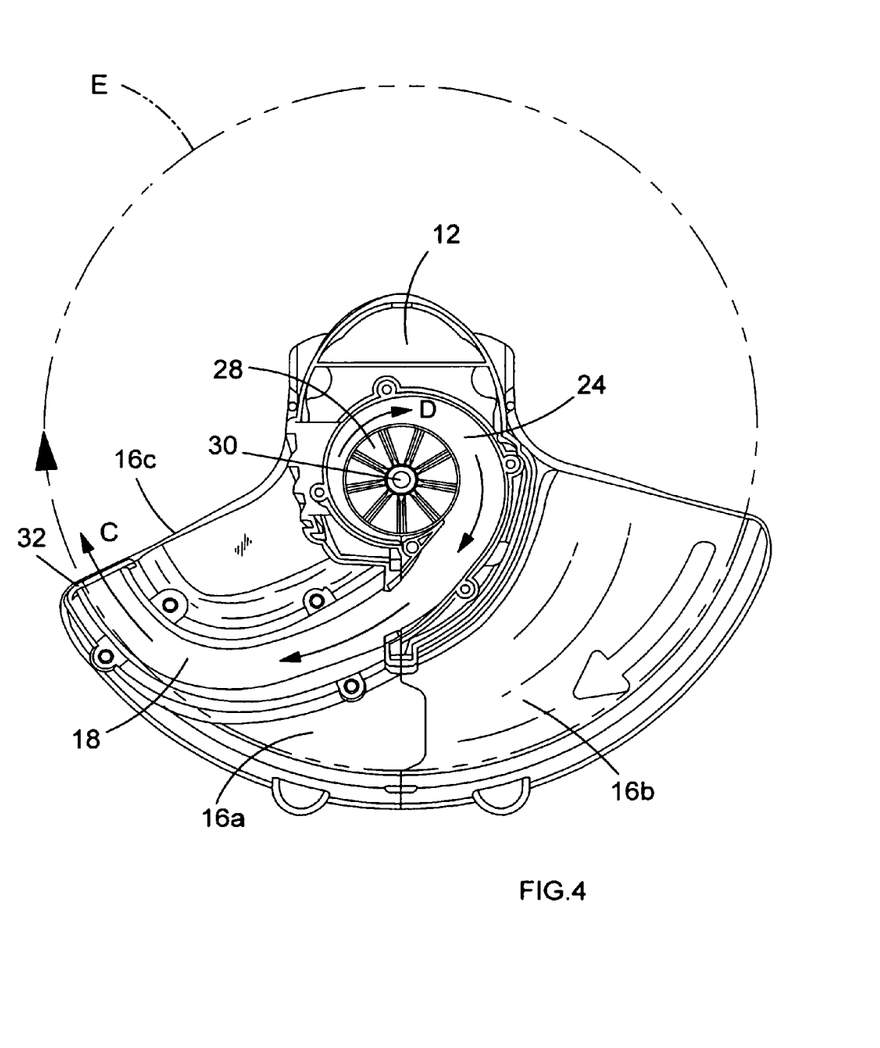
FIG. 4 is a cross-sectional view of the lower end part of the vegetation trimmer of FIG. 1 along the line A-A' marked in FIG. 3.

FIG. 4 is a cross-sectional view along the line A-A' marked in FIG. 3. As may be seen in FIG. 4, the duct 18 has a substantially uniform cross-section and the volute 24 is in the shape of a substantially equiangular spiral centred on the motor output shaft 30, on which is mounted fan 28. As fan 28 rotates in the direction indicated by arrow D, air is driven by the fan around the volute 24 and along duct 18, exiting the duct through air outlet 32 in the direction indicated by arrow C. Circle E also shown in FIG. 4 indicates the swathe of a cutting element mounted on the cutting head 22 during operation of the motor. As may be seen, the air outlet 32 is located on a radial edge 16c of the guard piece 16a at a distance from a centre of the guard substantially coincident with the swathe of the cutting element.

Figure 5:
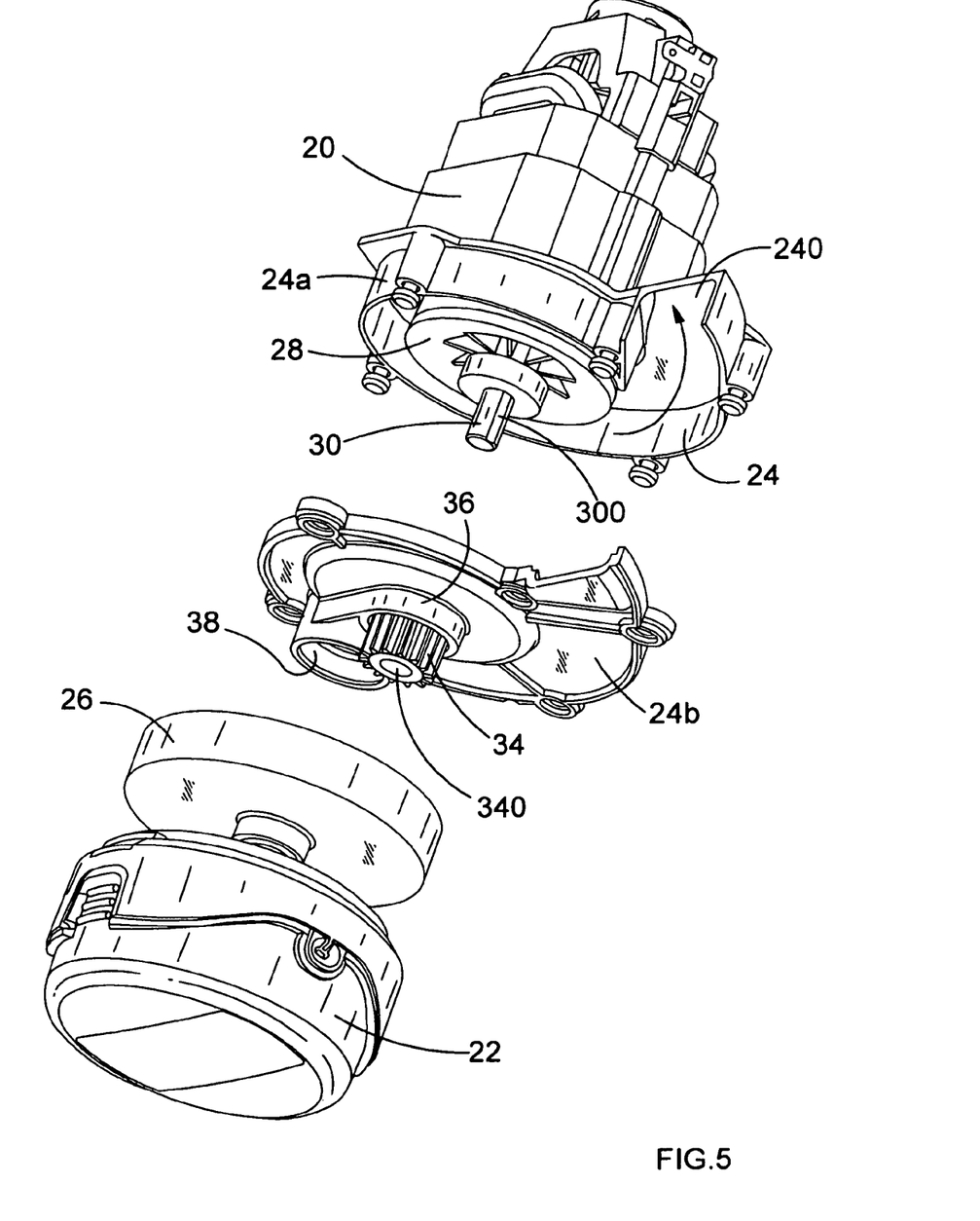
FIG. 5 is an exploded perspective view from below of some of the major internal components of the vegetation trimmer of FIG. 1.

FIG. 5 is an exploded view of the major internal components of the vegetation trimmer of FIG. 1. Starting at the top of FIG. 5, there is shown the motor 20, with the fan 28 mounted on the motor output shaft 30. The volute 24, which encloses fan 28, is assembled from two component aluminium castings: a body portion 24a and an end plate 24b. These two component parts are bolted together in a non-airtight fashion, such that air may be drawn into the volute by the fan 28 during operation of the motor 20, before being expelled through the exit mouth 240 of the volute 24. Centrally located on the outer end face of the end plate 24b of volute 24 is a first bearing 36, on which is mounted pinion wheel 34. Pinion wheel 34 and end plate 24b have a central aperture 340, whereby when end plate 24b is mounted to body portion 24a of volute 24, the motor output shaft 30 passes through aperture 340 and into pinion wheel 34. A flat 300 formed on one side of motor output shaft 30 ensures that the motor output shaft 30 engages with a corresponding flat formed on the interior surface of pinion wheel 34. In this way, end plate 24b doubles-up as both a component part of volute 24 and as a mounting plate for pinion wheel 34, which helps to minimize the total number of components of the vegetation trimmer, thereby reducing its manufacturing costs. For the same reason, the outer end face of end plate 24b also has a second bearing 38 for internal gear wheel 26 located thereon at an offset from the first bearing 36.

Figure 6:
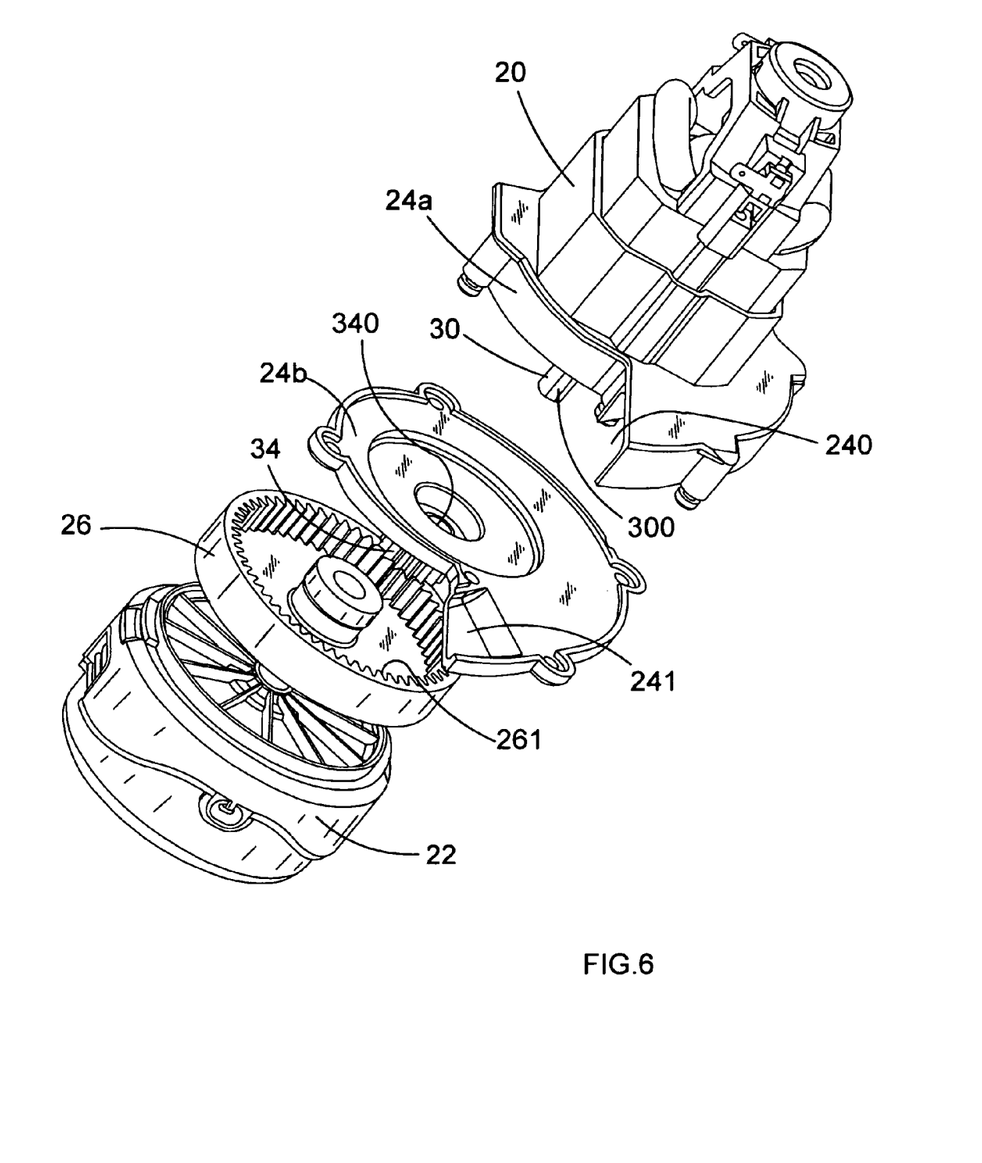
FIG. 6 is an exploded perspective view from above of the same major internal components of the vegetation trimmer of FIG. 1 as shown in FIG. 5.

FIG. 6 is a similar exploded view to FIG. 5, but seen from a different viewing angle. In this case, it is possible to see that end plate 24b comprises a spout 241 integrally cast therein, which helps to engage the volute 24 with duct 18 in an airtight fashion, as well as to bring the exit mouth 240 of the volute closer to cutting head 22, in the manner described above. Also visible in FIG. 6 is a plurality of gear teeth 261 formed on an inner circumferential surface of interior gear wheel 26. Gear teeth 261 engage with corresponding gear teeth formed on the outer circumferential surface of pinion wheel 34.

Figure 7:
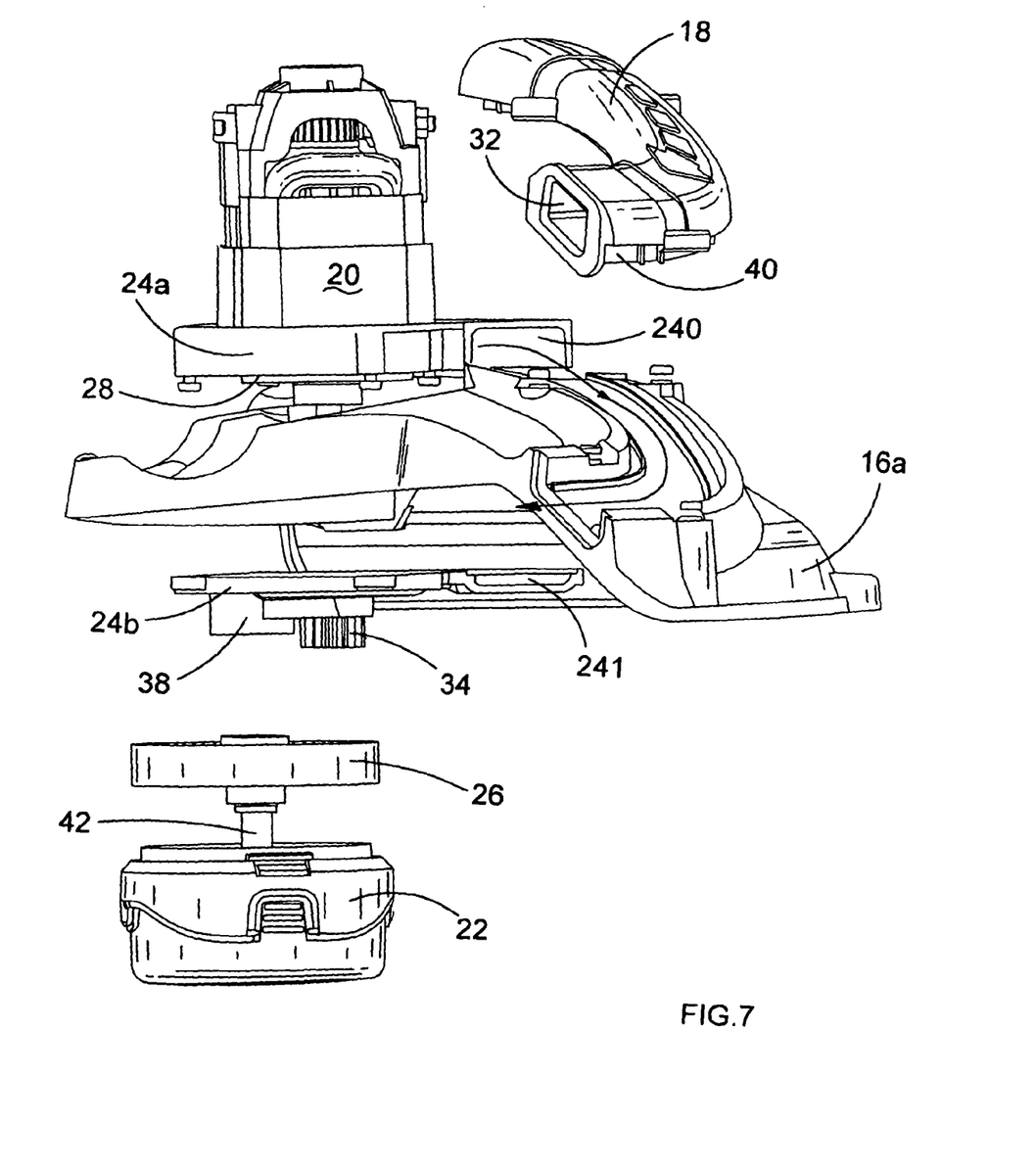
FIG. 7 is an exploded elevational view of some of the same major internal components of the vegetation trimmer of FIG. 1 as shown in FIG. 5, together with some of the major external components thereof.

Finally, FIG. 7 shows an exploded elevational view of some of both the internal and the external components of the vegetation trimmer of this embodiment. In particular, it may be seen in FIG. 7 that duct 18 comprises a liner 40. Liner 40 is moulded as a single component, in order to make duct 18 airtight. FIG. 7 also shows an axle 42, not readily visible in the other figures, by which internal gear wheel 26 is connected to cutting head 22.

What is claimed is:

1. A vegetation trimmer comprising:
   a motor housing;
   a motor located in the motor housing and having a motor output shaft;
   a cutting head for cutting vegetation presented thereto;
   a gear mechanism for transmitting power from said motor output shaft to said cutting head, the gear mechanism having a step-down gear ratio for reducing the rate of rotation of said cutting head relative to the rate of rotation of said motor,
   said gear mechanism comprising a pinion wheel mounted on the motor output shaft and an internal gear wheel engaging the pinion wheel and connected to the cutting head;
   a fan enclosed in a spiral volute and directly mounted on the motor output shaft, whereby the cutting head rotates in the same direction as the fan during operation of the motor;
   a guard attached to the motor housing; and
   the spiral volute having an exit mouth located above the guard, and a duct connected to the exit mouth and mounted on a top surface of the guard so as to carry air to an air outlet located on an outer radial edge of said guard that is substantially parallel to an outer perimeter of a swatch cut by said cutting head.

2. The vegetation trimmer according to claim 1, wherein the fan is centered on the motor output shaft and having a first bearing for said pinion wheel centrally located on an end face of said volute and a second bearing for said internal gear wheel located on said end face at an offset from said first bearing.

3. The vegetation trimmer according to claim 1, wherein the duct has a substantially uniform cross-section.

4. A vegetation trimmer according to claim 1, wherein said guard is assembled from two pieces and said duct is mounted on one of said pieces.

5. A vegetation trimmer according to claim 4, wherein said duct comprises a liner molded as a single component.

6. A vegetation trimmer according to any one of claim 5, wherein the exit mouth of said volute includes a spout projecting from the end face of said volute in the direction of said cutting head.

7. A vegetation trimmer comprising:
   a motor housing;
   a motor located in the motor housing and having a motor output shaft;
   a fan mounted on the motor output shaft and enclosed by a volute that blows air into a duct on a guard for said cutting head, wherein the guard has a top surface closer to said motor, and a lower surface closer to said cutting head;
   the duct being a molded tube element that is connected to an exit mouth of said volute and mounted on the top surface of the guard, and ending in an air outlet located on an outer radial edge of said guard that is substantially parallel to an outer perimeter of a swath cut by said cutting head;
   a gear mechanism connected to the motor output shaft adjacent the fan, the gear mechanism having a step-down gear ratio and having a gear mechanism output, the gear mechanism output rotating in the first direction;
   a cutting head connected to the gear mechanism output; and
   wherein the air in the duct is blown in the same direction as the rotation of the cutting head.

8. The vegetation trimmer according to claim 7 wherein the gear mechanism comprises a pinion wheel mounted to the motor output shaft and an internal gear wheel engaging the pinion wheel.

9. The vegetation trimmer according to claim 8, wherein the fan is enclosed within a spiral volute centered on the motor output shaft and having a first bearing for said pinion wheel centrally located on an end face of said volute and a second bearing for said internal gear wheel located on said end face at an offset from said first bearing.

10. The vegetation trimmer according to claim 7, wherein the duct has a substantially uniform cross-section.

11. The vegetation trimmer according to claim 10, wherein said guard is assembled from two pieces and said duct is mounted on one of said pieces.

12. A vegetation trimmer according to claim 11, wherein said duct comprises a liner molded as a single component.

13. A vegetation trimmer according to any one of claim 12, wherein the exit mouth of said volute includes a spout projecting from the end face of said volute in the direction of said cutting head.

* * * * *